(12) United States Patent
Guittet et al.

(10) Patent No.: US 7,646,905 B2
(45) Date of Patent: Jan. 12, 2010

(54) SCORING ESTROGEN AND PROGESTERONE RECEPTORS EXPRESSION BASED ON IMAGE ANALYSIS

(75) Inventors: Christelle Marie Guittet, Malvern (GB); Margaret Jai Varga, Malvern (GB); Paul Gerard Ducksbury, Malvern (GB)

(73) Assignee: Qinetiq Limited (GB)

( * ) Notice: Subject to any disclaimer, the term of this patent is extended or adjusted under 35 U.S.C. 154(b) by 361 days.

(21) Appl. No.: 10/540,444

(22) PCT Filed: Dec. 16, 2003

(86) PCT No.: PCT/GB03/05477

§ 371 (c)(1),
(2), (4) Date: Jun. 22, 2005

(87) PCT Pub. No.: WO2004/057513

PCT Pub. Date: Jul. 8, 2004

(65) Prior Publication Data

US 2006/0067887 A1    Mar. 30, 2006

(30) Foreign Application Priority Data

Dec. 23, 2002  (GB) ................... 0229734.9

(51) Int. Cl.
G06K 9/34    (2006.01)
G06K 9/36    (2006.01)
G06K 9/40    (2006.01)
G06K 9/46    (2006.01)

(52) U.S. Cl. ................ 382/133; 382/164; 382/165; 382/169; 382/170; 382/171; 382/172; 382/194; 382/274

(58) Field of Classification Search .............. 382/133, 382/163, 164, 165, 169, 170, 171, 172, 194, 382/274
See application file for complete search history.

(56) References Cited

U.S. PATENT DOCUMENTS 5,008,185 A * 4/1991 Bacus ................ 435/7.23

(Continued)

OTHER PUBLICATIONS

Rothman et al. "Potential Use of Spectral Image Analysis for the Quantitative Evaluation of Estrogen Receptors in Breast Cancer", Histology and Histopathology, pp. 1051-1057.

(Continued)

*Primary Examiner*—Brian P Werner
*Assistant Examiner*—Anthony MacKowey
(74) *Attorney, Agent, or Firm*—McDonnell Boehnen Hulbert & Berghofff LLP (57) ABSTRACT

A method of scoring Oestrogen and Progesterone Receptors expression (ER and PR) from histological images determines the percentage of brown image blob area in total blob area and derives percentage thresholds to quantify scoring. Brown blob area proportion is then compared with the thresholds to provide a first contribution to scoring of ER or PR. The number of relatively dark pixels is then counted, pixel number thresholds are determined to quantify scoring, and the number of relatively dark pixels is compared with the thresholds to provide a second contribution scoring of ER or PR. The two contributions are then added to provide an overall scoring in the range 0 to 8 which may be taken as a final score or it may be scaled to a conventional range 0 to 3.

6 Claims, 2 Drawing Sheets

U.S. PATENT DOCUMENTS

| | | | |
|---|---|---|---|
| 5,202,931 | A | 4/1993 | Bacus |
| 6,416,959 | B1 * | 7/2002 | Giuliano et al. ............. 435/7.2 |
| 6,546,123 | B1 * | 4/2003 | McLaren et al. ............ 382/128 |
| 6,671,624 | B1 * | 12/2003 | Dunlay et al. ................. 702/19 |
| 6,697,509 | B2 * | 2/2004 | De La Torre-Bueno ..... 382/133 |
| 7,219,016 | B2 * | 5/2007 | Rimm et al. .................. 702/19 |
| 7,272,252 | B2 * | 9/2007 | De La Torre-Bueno et al. .. 382/133 |
| 2003/0096322 | A1 * | 5/2003 | Giuliano et al. ............ 435/7.21 |
| 2003/0165263 | A1 * | 9/2003 | Hamer et al. ............... 382/133 |
| 2007/0053573 | A1 * | 3/2007 | Rabinovich ................ 382/133 |

OTHER PUBLICATIONS

Camp et al., "Automated Subcellular Localization and Quantification of Protein Expression in Tissue Microarrays", Nature Medicine, pp. 1323-1327, vol. 8, No. 11 (2002).

Schnorrenberg et al., "Computer-Aided Detection of Breast Cancer Nuclei", IEEE, pp. 128-140 (1997).

Roca et al., "Immunohistochemcial Correlation of Steroid Receptors and Disease-Free Interval in 206 Consectutive Cases of Breast Cancer: Validation of Telequantification Based on Global Scene Segmentation", Analytical Cellular Pathology, pp. 151-163 (1995).

Sklarew, et al. "Comparison of Microscopic Imaging Strategies for Evaluating Immunocytochemical (PAP) Steriod Receptor Heterogeneity", Cytometry, pp. 207-220 (1991).

Mink et al., "Einsatz der computergestuzen bildanalyse zur erfassung des immunhistochemischen rezeptorstatus beim mammakarzinom immunhistochemischen densitometrische rezeptroanalyse—IDRA", Geburtsh Frauenheilk, pp. 617-623 (1992).

El-Badawy et al. "Immunohistochemcial Progesterone Receptor Assay", Amer. Journal of Anatomic Pathology, pp. 704-710 (1991).

True, "Quantitative Immunohistochemical Assay of Estrogen Receptors by Image Analysis", Laboratory Investigation, pp. 80A (1987).

Lehr et al., "Quantitative Evaluation of HER-2/neu Status in Breast Cancer by Fluorescence in situ Hybridization and by Immunohistochemistry with Image Analysis", American Journal of Clinical Pathology, pp. 814-822 (2001).

Esteban, et al. "Biologic Significance of Quantitative Estrogen Receptor Immunohistochemical Assay by Image Analysis in Breast Cancer", American Journal of Clinical Pathology,, pp. 158-162 (1994).

Cavaliere et al. "Computer-assisted Immunocytochemical Determination of Breast Cancer Steroid Receptors. Frozen Sections vs Paraffin Sections", The Breast, pp. 476-483 (2001).

Tsapatsoulis et al., "An Image Analysis System for Automated Detectioon of Breast Cancer Nuclei", IEEE, pp. 512-515 (1997).

* cited by examiner

SCORING ESTROGEN AND PROGESTERONE RECEPTORS EXPRESSION BASED ON IMAGE ANALYSIS

This invention relates to a method, an apparatus and a computer program for scoring Oestrogen and Progesterone Receptors expression (ER and PR) in histological image data to provide information for clinical treatment and prognosis. It is particularly (but not exclusively) relevant to providing clinical information for breast cancer management.

Breast cancer is a common form of female cancer, and it also occurs in the male albeit with lower frequency: Once a lesion indicative of breast cancer has been detected, tissue samples are taken and examined by a histopathologist to establish a diagnosis, prognosis and formulate a treatment plan. However, pathological analysis of tissue samples is a time consuming process. It entails interpretation of images by human eye. In the main this is a reproducible and reliable process but can be can subjective. There can be inaccuracies in the observation of the same sample by different observers and even by the same observer at different times. For example, two different observers assessing the same ten tissue samples may give different opinions for three of the slides—30% error. The problem is exacerbated by heterogeneity, i.e. complexity of some tissue sample features.

The hormone receptor status of breast cancer cells provides useful information for treatment and prognosis since the presence of some of these receptors can provide a means for controlling cell growth via chemotherapy. In general, cancers in which the cells express ER in their nuclei have a better prognosis and can respond to hormonal manipulation for example using the anti-oestrogen drug Tamoxifen. ER and PR are steroid hormone receptors. ER and PR expression can be observed in many tissue types, and in both tumour and non-tumour material. In the breast they are expressed by normal epithelium and in approximately 70% of breast cancers. They are used in breast cancer assessment because steroid hormone status guides selection of therapy. Almost 75% of breast cancers expressing ER will respond to this therapy, whereas less than 5% not expressing ER will respond. In general, cancers that are ER positive will also be PR positive. However, carcinomas that are PR positive, but not ER positive, may have a poorer response to endocrine therapy. Histological images produced for ER and PR determination are indistinguishable visually, though they are obtained from specimens stained by applying different antibodies to a specimen tumour section. Staining of specimen tissue slides is obtained by using antibodies specific to respective receptors, i.e. one antibody for ER and a different antibody for PR. Because ER and PR are both steroid receptors, their associated staining will be similar and so the same process can be used to extract both.

U.S. Pat. No. 5,202,931 discloses detecting ER and PR by a specimen staining technique using immunoperoxidase followed by counterstaining. Two monochromatic optical filters are used to separate images of stained receptor areas and nuclear areas. Optical density measurements yield intensity values related to the quantity of hormonal receptor in the specimen.

C Rothman et al. disclose ER evaluation by spectral image analysis in Histology and Histopathology, Vol. 15, pages 1051-1057, October 2000, "Potential Use of Image Analysis of the Quantitative Evaluation of Oestrogen Receptors in Breast Cancer". Specimens were stained by the immunoperoxidase method followed by haematoxylin counterstain. Image pixels were compared with a linear combination of reference spectra. Products of ER spectra with pixel intensity gave net intensity of ER staining.

Techniques for ER analysis are disclosed by R L Camp et al., in Nature Medicine, Vol. 8, No. 11, November 2002, "Automated Subcellular Localisation and Quantification of Protein Expression in Tissue Microarrays". Image thresholding is first used to create a binary mask (pixels equal to 1 or 0 only) in which pixel value 1 locates a target signal from a tumour. Fluorescent tags are applied to separate tumours from stroma and define subcellular compartments. Distribution of a target antigen is then assessed according to its co-localisation with these tags. Target expression is delineated as the sum of its intensity divided by total size. Another technique involves subtracting a slightly out-of-focus image from an in-focus image, which is said to improve assignment of pixels to a particular subcellular compartment (nucleus, membrane or cytoplasm). Finally, each pixel is assigned to a specific subcellular compartment on the basis of a ratio between two compartment-specific markers.

Computer-aided detection of breast cancer nuclei in connection with ER and PR is disclosed by F Schnorrenberg et al. in IEEE Trans. Information Technology in Biomedicine, pages 128-140, Vol. 1, No. 2, June 1997. This reference describes the use of an algorithm to process a image of a stained tissue specimen in order to make a histogram of the image bimodal: i.e. the histogram has a first mode indicating cell nuclei and a second mode indicating background. To achieve this it applies to the histogram iteratively a receptive field filter in combination with a non-linear Gaussian difference squashing function, which ensures that detection is predominantly dependent on geometry as opposed to intensity. Detected nuclei are then classified according to staining intensity.

O. Ferrer Roca et al. disclose ER and PR determination in Analytical Cellular Pathology Vol. 9, pages 151-163, 1995. The paper is entitled "Immunohistochermical Correlation of Steroid Receptors and Disease-free Interval in 206 Consecutive Cases of Breast Cancer: Validation of Telequantification Based on Global Scene Segmentation". Immunohistochemical quantification of images of stained specimens was based on pixel densitometric measurements by area with a 550 nm filter of 20 nm bandwidth. The measurements obtained percentage positive area and staining intensity.

R. J. Sklarew et al. disclose determination of ER and PR in Cytometry (the journal of the society for Analytical Cytometry of the United States) Vol. 12, page 207-220, 1991, "Comparison of Microscopic Imaging Strategies for Evaluating Immunocytochemical (PAP) Steroid Receptor Heterogeneity". Specimens were not tissue samples but instead obtained from cell cultures. Measurements were made on stained specimens to determine integrated optical density, cell nucleus projected area and cell nucleus perimeter, nuclei being identified by use of a computer mouse to indicate areas of an image of the specimen on a monitor.

It is an object of the invention to provide an alternative form of objective measurement of ER and PR to support a pathologist's diagnosis and patient treatment.

The present invention provides an automated method of scoring Oestrogen and Progesterone Receptors expression (ER and PR) from image data obtained from histological slides characterised in that it includes determining the number of relatively dark image pixels compared to relatively bright image pixels and scoring ER or PR in accordance with the magnitude of the number of relatively dark pixels.

The invention provides the advantage that it is an objective procedure for scoring ER or PR.

The number of relatively dark image pixels may be determined by transforming the image data to a different image space having an intensity image plane and counting the number of pixels having intensities below a predetermined intensity threshold.

In another aspect, the present invention provides an automated method of scoring ER and PR from image data obtained from histological slides characterised in that it includes the steps of:
a) determining the number of pixels in an image having relatively dark intensities compared to other pixels in an image,
b) determining pixel number thresholds to quantify scoring, and
c) comparing the number of relatively dark pixels with the thresholds and scoring ER or PR in accordance therewith.

In a further aspect, the present invention provides an automated method of scoring ER and PR from image data obtained from histological slides characterised in that it includes the steps of:
a) determining what proportion of total blob area is brown blob area in an image,
b) determining brown blob area proportion thresholds to quantify scoring, and
c) comparing the brown blob area proportion with the thresholds and scoring ER or PR in accordance therewith.

The proportion of total blob area which is brown blob area may be determined by the steps of:
a) remapping pixel intensities in the image data to increase the contrast of relatively darker image regions and to transform relatively brighter image regions into a contrast-free background,
b) converting the remapped image data into thresholded binary images from which total blob area and brown blob area are discernible respectively, and
c) expressing brown blob area as a proportion of total blob area.

The step of scoring ER or PR may provide a first contribution thereto and the method may include:
a) providing a second contribution to scoring of ER or PR by determining the number of relatively dark image pixels compared to relatively bright image pixels and deriving the second contribution in accordance with the magnitude of the number of relatively dark pixels, and
b) combining the first and second contributions.

The number of relatively dark image pixels may be determined by transforming the image data to a different image space having an intensity image plane and counting the number of pixels having intensity below a predetermined intensity threshold.

In yet another aspect, the present invention provides an automated method of scoring ER and PR for image data obtained from histological slides characterised in that it includes the steps of:
a) remapping pixel intensities in the image data to increase the contrast of relatively darker image regions and to transform relatively brighter image regions into a contrast-free background,
b) converting the remapped image data into thresholded images in which total blob area and brown blob area respectively are distinguished from other image regions,
c) expressing brown blob area as a proportion of total blob area to provide a first contribution to a score,
d) providing a second contribution to the score by determining the number of relatively dark image pixels compared to relatively bright image pixels and deriving the second contribution in accordance with the magnitude of the number of relatively dark pixels, and
e) deriving the score on the basis of the first and second contributions collectively.

In this aspect, the method may include determining a hue for the image data and deriving a correction for the score indicated by the first and second contributions if the hue indicates a degree of blueness or brownness which renders such correction appropriate.

In an alternative aspect, the present invention provides computer apparatus for scoring ER and PR from image data obtained from histological slides characterised in that the apparatus is programmed to determine the number of relatively dark image pixels compared to relatively bright image pixels and to score ER or PR in accordance with the magnitude of the number of relatively dark pixels.

The computer apparatus may be programmed to determine the number of relatively dark image pixels by transforming the image data to a different image space having an intensity image plane and counting the number of pixels having intensities below a predetermined intensity threshold.

In a further alternative aspect, the present invention provides computer apparatus for scoring ER and PR from image data obtained from histological slides characterised in that it is programmed to:
a) determine the number of pixels in an image having relatively dark intensities compared to other pixels in an image,
b) determine pixel number thresholds to quantify scoring, and
c) compare the number of relatively dark pixels with the thresholds and score ER or PR in accordance therewith.

In another alternative aspect, the present invention provides computer apparatus for scoring ER and PR from image data obtained from histological slides characterised in that it is programmed to:
a) determine what proportion of total blob area is brown blob area in an image,
b) determine brown blob area proportion thresholds to quantify scoring, and
c) compare the brown blob area proportion with the thresholds and score ER or PR in accordance therewith.

The apparatus may be programmed to determine the proportion of total blob area which is brown blob area by:
a) remapping pixel intensities in the image data to increase the contrast of relatively darker image regions and to transform relatively brighter image regions into a contrast-free background,
b) converting the remapped image data into thresholded binary images from which total blob area and brown blob area are discernible respectively, and
c) expressing brown blob area as a proportion of total blob area.

The apparatus may be programmed to score ER or PR as a first contribution thereto and also be programmed to:
a) provide a second contribution to scoring of ER or PR by determining the number of relatively dark image pixels compared to relatively bright image pixels and deriving the second contribution in accordance with the magnitude of the number of relatively dark pixels, and
b) combine the first and second contributions.

The apparatus may be programmed to determine the number of relatively dark image pixels by transforming the image data to a different image space having an intensity image plane and counting the number of pixels having intensity below a predetermined intensity threshold.

In still another alternative aspect, the present invention provides computer apparatus for scoring ER and PR from image data obtained from histological slides characterised in that it is programmed to:

a) remap pixel intensities in the image data to increase the contrast of relatively darker image regions and to transform relatively brighter image regions into a contrast-free background, b) convert the remapped image data into thresholded images in which total blob area and brown blob area respectively are distinguished from other image regions, c) express brown blob area as a proportion of total blob area to provide a first contribution to a score, d) provide a second contribution to the score by determining the number of relatively dark image pixels compared to relatively bright image pixels and deriving the second contribution in accordance with the magnitude of the number of relatively dark pixels, and e) derive the score on the basis of the first and second contributions collectively.

The computer apparatus may be programmed to determine a hue for the image data and derive a correction for the score indicated by the first and second contributions if the hue indicates a degree of blueness or brownness which renders such correction appropriate.

In a different aspect, the present invention provides a computer programme for scoring ER and PR from image data obtained from histological slides characterised in that it includes instructions for determining the number of relatively dark image pixels compared to relatively bright image pixels and scoring ER or PR in accordance with the magnitude of the number of relatively dark pixels.

The programme may includes instructions for determining the number of relatively dark image pixels by transforming the image data to a different image space having an intensity image plane and counting the number of pixels having intensities below a predetermined intensity threshold.

In another different aspect, the present invention provides a computer programme for scoring ER and PR from image data obtained from histological slides characterised in that it includes instructions for:

determining the number of pixels in an image having relatively dark intensities compared to other pixels in an image, determining pixel number thresholds to quantify scoring, and comparing the number of relatively dark pixels with the thresholds and scoring ER or PR in accordance therewith.

In a further different aspect, the present invention provides a computer programme for scoring ER and PR from image data obtained from histological slides characterised in that it includes instructions for:

a) determining what proportion of total blob area is brown blob area in an image, b) determining brown blob area proportion thresholds to quantify scoring, and c) comparing the brown blob area proportion with the thresholds and scoring ER or PR in accordance therewith.

The programme may include instructions for determining the proportion of total blob area which is brown blob area by:

remapping pixel intensities in the image data to increase the contrast of relatively darker image regions and to transform relatively brighter image regions into a contrast-free background, converting the remapped image data into thresholded binary images from which total blob area and brown blob area are discernible respectively, and expressing brown blob area as a proportion of total blob area.

The instructions for scoring ER or PR may be for providing a first contribution thereto and the programme may also include instructions for:

a) providing a second contribution to scoring ER or PR by determining the number of relatively dark image pixels compared to relatively bright image pixels and deriving the second contribution in accordance with the magnitude of the number of relatively dark pixels, and b) combining the first and second contributions.

The programme may include instructions for determining the number of relatively dark image pixels by transforming the image data to a different image space having an intensity image plane and counting the number of pixels having intensity below a predetermined intensity threshold.

In another different aspect, the present invention provides a computer programme for scoring ER and PR from image data obtained from histological slides characterised in that it includes instructions for implementing the steps of:

f) remapping pixel intensities in the image data to increase the contrast of relatively darker image regions and to transform relatively brighter image regions into a contrast-free background, g) converting the remapped image data into thresholded images in which total blob area and brown blob area respectively are distinguished from other image regions, h) expressing brown blob area as a proportion of total blob area to provide a first contribution to a score, i) providing a second contribution to the score by determining the number of relatively dark image pixels compared to relatively bright image pixels and deriving the second contribution in accordance with the magnitude of the number of relatively dark pixels, and j) deriving the score on the basis of the first and second contributions collectively.

The programme may include instructions for determining a hue for the image data and deriving a correction for the score indicated by the first and second contributions if the hue indicates a degree of blueness or brownness which renders such correction appropriate.

In order that the invention might be more fully understood, embodiments thereof will now be described, by way of example only, with reference to the accompanying drawings, in which:—

Figure 1:
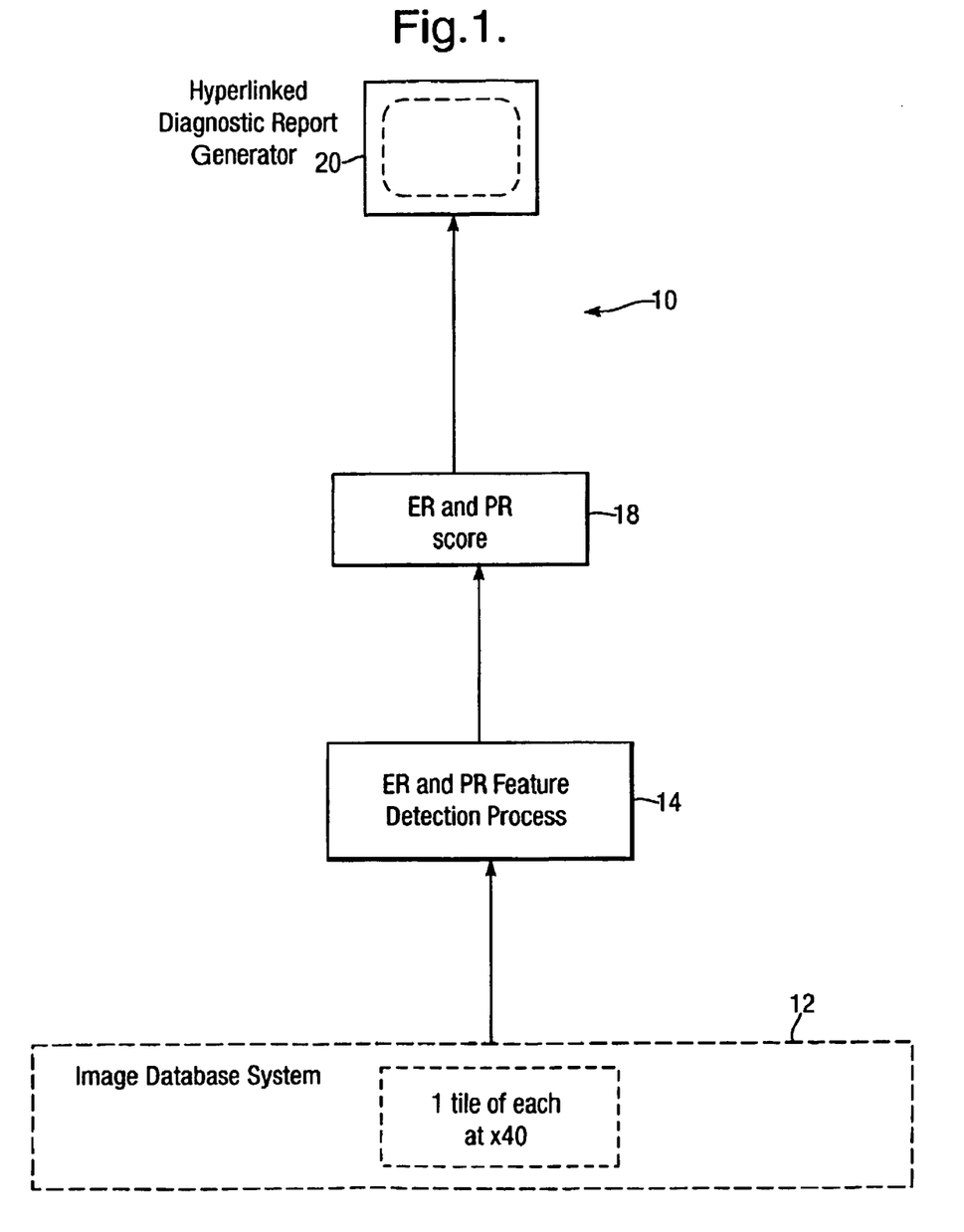
FIG. 1 is a block diagram of a procedure of the invention for scoring oestrogen and progesterone receptors expression.

Referring to FIG. 1, there is illustrated a procedure 10 of the invention for scoring the expression of ER and PR in tissue samples presented as histopathological slides of carcinomas of the breast. The procedure 10 requires data from histological slides in a suitable form. Sections are taken (cut) from breast tissue samples (biopsies) and placed on glass slides. Slides are stained using a standard peroxidase-conjugated streptavidin-biotin method with 3,3'-diaminobenzidine as a chromogen to detect a reaction for c-erbB-2, ER and PR. Using this method, a positive reaction is seen as a brown stain. Staining for ER and PR is seen in the nuclei of tumour cells and any normal breast luminal epithelial cells. This standard immunohistochemical protocol is widely applied to the detection of a broad range of antibodies across all subspecialties in pathology. For example, the same methodology is used to score a broad range of markers e.g. proliferation markers (MIB-1, Mcm-2, Mcm-5; cell cycle regulators (cyclins A, D and E) and growth factor receptors (EGFR) that are being investigated as prognostic and therapeutic adjuncts in a range of tumours that include colorectal cancer; melanoma; prostate cancer, and brain tumours.

In the present example, image data were obtained by a pathologist using Zeiss Axioskop microscope with a Jenoptiks Progress 3012 digital camera. Image data from a slide is a set of digital images obtained at a linear magnification of 40 (i.e. 40×).

To select images, a pathologist scans the microscope over a slide, and at 40× magnification selects a region (referred to as a tile) of the slide which appears to be most promising in terms of an analysis to be performed. This region is then photographed using the microscope and digital camera referred to above. The digital camera produces a digitised image in three colours, i.e. red, green and blue (R, G & B) intensity values for each pixel each in eight bits and therefore in the range 0 to 255: each image is an electronic equivalent of a tile. Three intensity values are obtained for each pixel in a pixel array to provide a colour image as a combination of R, G and B image planes. The image data from the tile is stored in a database 12 for later use. ER and PR receptors expression are determined using a feature detection process 14: this provides a score 18 for input to a diagnostic report at 20.

ER and PR are measured from brown stain characteristics (blob colour intensity and area ratio) in a specimen produced using tissue staining processes mentioned above. The objective of the procedure 10 is to quantify the ER and PR positivity in a tumour: this uses the fact that the more oestrogen or progesterone positive a specimen is the greater the intensity and area of its brown stain.

In a prior art manual procedure, a clinician places a slide under a microscope and examines a region of it at magnification of ×40 or others for indications of ER and PR. The prior art manual procedure for scoring ER and PR involves a pathologist estimating by eye the percentage of positive response as well as staining intensity. The process described below in this example replaces the prior art manual procedure with an objective procedure.

Figure 2:
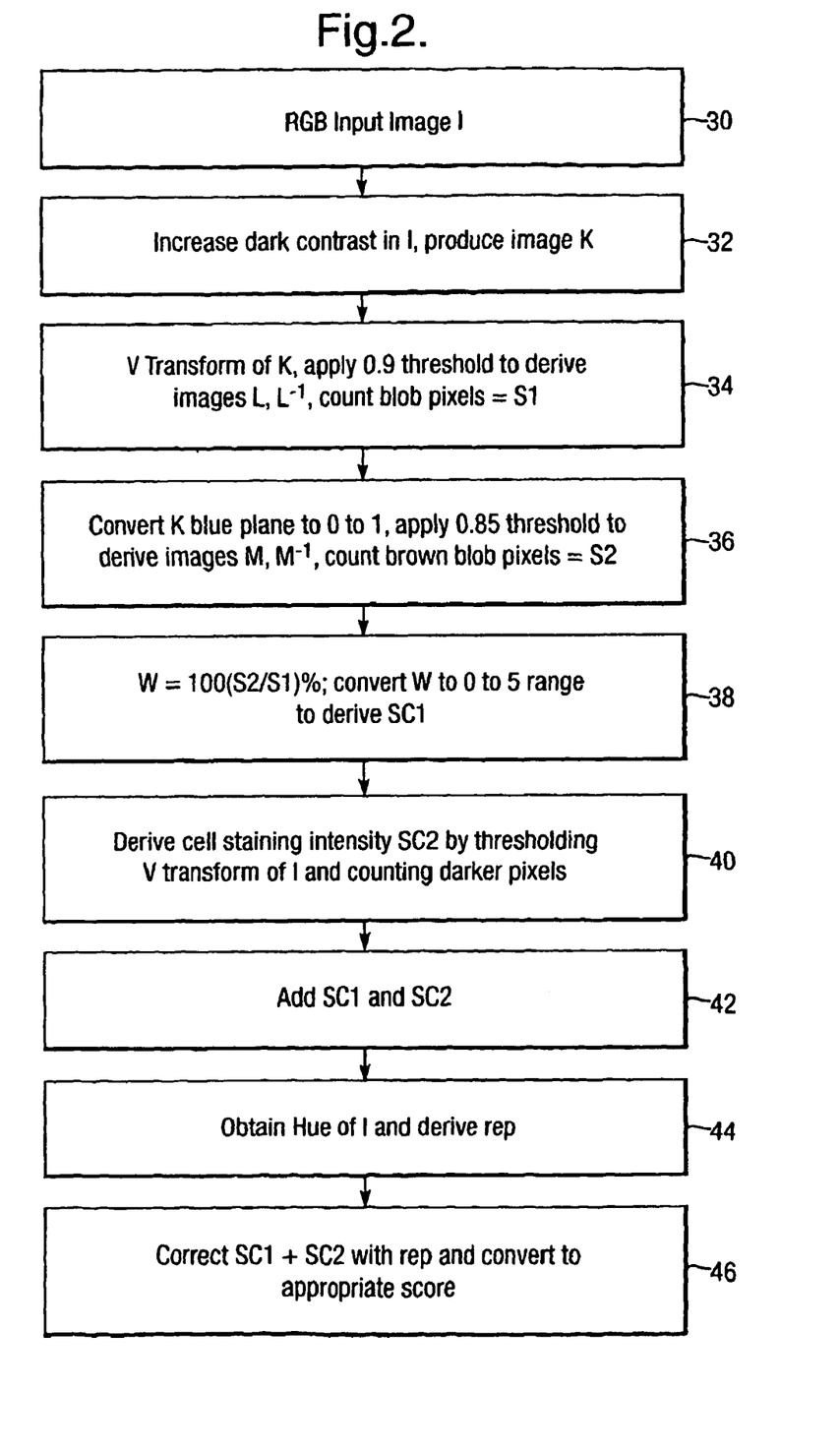
FIG. 2 is a block diagram showing part of the procedure of FIG. 1 in more detail.

Referring now to FIG. 2, the process 14 is shown in more detail. At 30 an input red, green and blue (RGB) digital colour image (initial image designated I) is a starting point for obtaining a score for stained area proportion. The image I has three eight-bit values in the range 0 to 255 per pixel for the R, G and B image planes. Images of histological slides such as the image I show objects referred to as "blobs" having a variety of colours, shapes and sizes, some of which are of interest for ER and PR scoring and some are not. Blobs appearing brown are of interest for ER/PR measurement. The "stained area proportion" measurement is the sum of the areas of brown stained blobs divided by the sum of the areas of all blobs in the image.

It has been found that pixels of interest for the purposes of assessing staining are those with relatively low intensity values. The next stage 32 is therefore to transform the initial image I so that an intensity range 0-100 of its darker pixels in each of the three R, G and B image planes is transformed by a mapping to fill the full eight-bit intensity range 0 to 255: this means that a pixel intensity value of 100, which is less than half but more than one quarter of the 255 maximum intensity value, becomes transformed to 255. It also has the effect of transforming pixels in I with intensity greater than 100 to 255. If a pixel has R, G and B all equal to 255, it appears white in the image.

In this example, specimen images were processed in an automated manner by computer using computer software referred to as "Matlab®" produced by Mathworks Inc., an American corporation. This software provides a variety of image processing functions Blobs are identified in the initial image I using the Matlab "imadjust" function, which maps an image's intensity values to a new range. Inadjust is used as previously indicated to remap darker pixel intensity values of all three I image planes R, G and B in the range 0 to 100 to fill the full intensity range of 0 to 255: this increases the contrast of darker regions of the image as well as transforming into a contrast-free white background those pixels with relatively high intensities of 100 and above in all image planes. This transformation is shown in Table 1 below.

TABLE 1

Transformation from Image I to Image K

| Input image I:<br>R, G or B pixel value $P_I$ | Output image K:<br>R, G or B pixel value $P_K$ |
| --- | --- |
| $0 \leq P_I \leq 100$ | $P_K = 255 P_I / 100$ |
| $P_I \geq 100$ | $P_K = 255$ |

The syntax of imadjust for mapping the input image I to an output image K is:

$$K = \text{imadjust}(I, [\text{low\_in high\_in}], [\text{low\_out high\_out}]) \quad (1)$$

where low_in and high_in are the chosen dark intensities 0 and 100 in the input image I which are mapped to low_out and high_out 0 and 255 in the output image K at 32. Because only relatively darker pixels are retained, it is assumed that they approximately correspond to all blobs whether stained or not. A bitmap image is consequently obtained at 34 using another Matlab function referred to as "im2bw", which creates from the RGB image K a binary bitmap image denoted L with pixel values 0 and 1 derived using a luminance threshold of 0.9.

To derive L, the image K is firstly converted from red/green/blue (RGB) to a one colour image. In this example the conversion of K is by transformation into a different image space hue/saturationl/value (HSV). Value is also referred to as brightness, luminance or intensity. The RGB to HSV transformation is well known and described in more detail on page 77 of Image Based Measurement Systems, F. Van Der Heijden. It will not be described further. It is not essential to use HSV, one could select one of the image planes or use another known transformation such as principal component analysis (see e.g. Jackson J. E., 'A User Guide to Principal Components' pp 1-25, John Wiley & Sons, 1991). In the present example a one colour image is derived by setting to zero the hue H and saturation S components of pixels in the transformation of K, and the value (luminance) component V is retained as a greyscales image. V has values in the range 0 to 1.0. All pixels with a value greater than or equal to 0.9 are then set to 1 and those less than 0.9 are set to 0: this creates the binary bitmap image L in which pixels of blobs are 0 and background pixels are 1.

The sum of the areas of all blobs in image I collectively (i.e. whether stained brown or not) is denoted by S1. S1 is computed by inverting the bitmap image L (exchanging 1 for 0 pixel values and vice versa) to form an image $L^{-1}$ (or "not(L)" in Matlab) in which blob pixels are value 1; pixels in $L^{-1}$ which are not blob pixels are 0. The value 1 pixels in $L^{-1}$ are then counted at 34 to provide S1, which is given in Matlab by the instruction:

$$\text{i.e. } S1 = \text{sum}(\text{sum}(\text{not}(L))) \quad (2)$$

The sum of the areas of all blobs stained brown in image I denoted S2 is now required. Here again the image K (see at (1) above) is converted at 36 to a single colour greyscales image, but for this purpose the blue image plane of the image K is selected: this is because trials showed that the blue image plane contains more brown staining information and fewer spurious details than the green and red planes. Using the im2bw Matlab function, as before the single colour image pixel values (in this case the blue image plane) are converted from the range 0 to 255 to 0 to 1 by division by the maximum of the pixel values, normally 255. A second binary bitmap image M is obtained from the 0 to 1 pixel value equivalent of the single colour image by thresholding: i.e. all pixels with a value greater than or equal to a threshold of 0.85 are set to 1 and those less than 0.85 are set to 0. This threshold provides for removal (merging into background) of blob pixels originally bluish and retention of those originally brownish. The sum S2 of the areas of all blobs stained brown is computed at 36 by inverting the bitmap image M to form image $M^{-1}$ (or "not(M)"), and counting the pixels which are equal to 1 in $M^{-1}$ and which are therefore blob pixels; here again pixels in $M^{-1}$ which are not brownish blob pixels are 0. S2 is given by the Matlab instruction:

$$S2 = \text{sum}(\text{sum}(\text{not}(M))) \quad (3)$$

The percentage W of blobs or cells stained brown is then computed at 38 by dividing S2 by S1 and multiplying by 100:

$$\text{i.e. } W = 100 S2/S1 \quad (4)$$

The score for proportion staining is denoted as SC1 and is obtained at 38 by comparing W to the thresholds mentioned above. For this example, the score for proportion of brown staining of cells in ER and PR detection in breast cancer is tabulated in Table 2 below. The thresholds in Table 2 are largely as used in manual assessment, except that the thresholds for scores 0 and 1 have been changed slightly from the manual equivalents, as this proved to be more efficient than the manual equivalents using a specific set of trial images in testing the invention.

TABLE 2

Score for Proportion of Brown Staining:

| W: % of cells stained brown | Proportion Score SC1 |
|---|---|
| 0-0.3% | 0 |
| 0.3% < W < 1% | 1 |
| 1-10% | 2 |
| 11-33% | 3 |
| 34-66% | 4 |
| 67-100% | 5 |

The next stage 40 is to obtain a score SC2 for cell staining intensity. A study of a set of trial images with different staining intensity for the purposes of the invention has shown that the occurrence frequency of relatively darker pixels (intensity value $\leq 100$) in the RGB initial image I varies sufficiently with intensity staining to provide a measurement technique in this regard. In particular, strong staining is characterised by a relatively high occurrence frequency of darker pixels, but this frequency is zero (no darker pixels) when there is no staining. For weak to moderate staining, the frequency is intermediate. Consequently, in accordance with the invention, the next step is to form a histogram showing pixel intensity occurrence frequency: to achieve this, the RGB initial image I undergoes an HSV transformation of the kind described earlier. Pixel intensities in the V (value or intensity) image plane of the transformed image are then analysed to produce the histogram. The histogram has an abscissa axis with 256 pixel intensity values or bins and an ordinate axis showing number of pixels with the intensity associated with the respective bin each case. Based on these observations, it was decided to sum the numbers of pixels contained in a sufficient number of the lower valued (darker) pixel intensity bins to give a statistically significant result. The number of bins is not very critical and in this example the bins that were chosen were bins 1 to 100 inclusive: this corresponds to counting pixels with intensities below a intensity threshold equal to the intensity associated with bin number 101. Here again Matlab functions were used such as "imhist" that returns the histogram as bin counts and bin locations as x (ordinate) values. A Matlab routine was written to carry out the Summation of pixels in bins 1 to 100.

The score SC2 for intensity staining was derived using thresholds derived from analysis of a set of images and partly from the value of SC1. Denoting the total number of pixels in bins 1 to 100 collectively as NP(1:100), SC2 was 3 if NP(1:100) was greater than 100,000. SC2 was 2 if NP(1:100) was in the range 2001 to 100,000, and it was 1 if the number of pixels was found to be in the range 400 and 2000. If the number of pixels was less than 400, SC2 would be 0 if SC1 was 4 or less and 1 if SC1 was 5. This is tabulated below in Table 3.

TABLE 3

Score for intensity of staining:

| NP(1:100): Number of Pixels in Bins 1 to 100 | SC1 | SC2 | Staining |
|---|---|---|---|
| >100,000 | Any | 3 | Strong |
| 2,001 to 100,000 | Any | 2 | Moderate |
| 400 to 2,000 | Any | 1 | Weak |
| <400 | 5 | 0 | Weak |
| <400 | 0 to 4 | 0 | None |

Having obtained SC1 and SC2, they are summed at 42 to provide an overall intermediate score in the range 0 to 8. The overall score is subject to the condition that if SC1 or SC2 is 0, the overall score is also set to 0. This is because a zero percentage of brown blobs implies zero staining intensity and vice versa. In principle one could obtain an estimate of ER or PR using SC1 or SC2 alone, but results are better when SC2 is combined with SC1 as described above.

The overall 0-8 intermediate score may be taken as the final score, or it may be converted to an overall final score in a more conventional range 0 to 3 as set out in Table 4 below.

TABLE 4

Overall Final Score

| Overall Intermediate Score | Overall Final Score | Endocrine Treatment Prospects |
|---|---|---|
| 0 | 0 | Failure to respond |
| 2 or 3 | 1 | Small Chance of Response |
| 4, 5 or 6 | 2 | 50% Chance of Response |
| 7 or 8 | 3 | High Chance of Response |

The procedure of the invention is rapid. One image takes on average 9 seconds to process. It has been evaluated for an overall number of 97 images for ER and 92 images for PR. Results produced by use of the invention with these images have been compared to assessments made manually by a pathologist, and are very encouraging. Over 80% of scores obtained as described above agreed with a pathologist's overall final score, and over 90% either agreed with the pathologist's score or differed by not more than 1.

It has been found that a scoring failure may result from confusion between slides stained very dark blue and those stained very brown. To counteract this, a correction for the overall final score has been developed based on image coloration. The correction involves transforming the RGB initial image I to a hue, saturation, value (HSV) image of the kind described earlier. Colour perception usually refers to three quantities that are hue, saturation and brightness: hue refers more specifically to a dominant wavelength or colour in an image and thus it is of interest for discriminating between blue and brown.

Hue provides a check on whether blobs treated as being brown are indeed brown, or instead dark blue as sometimes happens with badly stained images. A parameter called "rep" is obtained by summing the values of pixels of blobs thought to be brown. Blobs thought to be brown are indicated by pixels with value 1 in the thresholded binary image $M^{-1}$ (in Matlab code "not(M)") previously defined. A hue or H image plane of I is derived at 44 for the initial image I by HSV transformation as aforesaid and rejection of the S and V values. Each pixel value in H of I is then multiplied by a respective pixel value in the same location in $M^{-1}$ to yield HB of I. All non-blob pixels in HB of I are 0 and all blob pixels have respective values as in H of I. The required parameter rep is now obtained at 44 once more by summing the pixel values in HB of I: this sum—i.e. rep—was observed to vary considerably depending on whether blobs have been stained predominantly blue or predominantly brown. A small value of rep is usually characteristic of bluish slides while a large value of rep is characteristic of brownish slides. Rep therefore provides a test of blueness or brownness enabling a correction to be applied to an overall intermediate score in the range 0 to 8: the correction increases or decreases the overall intermediate score according to what rep indicates the associated slide staining colour to be.

For example, a small value of rep such as 0.05 indicates bluish images not containing many brown pixels. An overall intermediate score of 7 for an image associated with a small value of rep is corrected at 46 by being decreased by 1 or 2 to reflect the relative paucity of brown pixels which its rep value indicates: such an image is unlikely to merit an overall intermediate score of 7 (overall final score 3) but is more likely to merit an overall intermediate score of 6 or 5 (overall corrected final score 2). It has been found that this correction improves results for both ER and PR. For PR in particular, 88% of corrected overall final scores agreed with the pathologist's manual result, and none differed from the latter by more than 1. Since pathologist's manual results can be up to 30% in error as mentioned earlier, the difference may not be statistically significant. However, these results were obtained using a limited data set. It is desirable to verify the procedure of the invention using more images, laboratories and staining procedures.

The example of the invention in the foregoing description can clearly be implemented by an appropriate computer program comprising program instructions embodied in an appropriate carrier medium and running on a conventional computer system. As described, much of the program requirements are commercially available in Matlab, and can easily be augmented. The carrier medium may be a memory, a floppy or compact or optical disc or other hardware recordal medium, or an electrical signal. Such a program is straightforward for a skilled programmer to implement without requiring invention, because it involves well known computational procedures.

The invention claimed is:

1. An automated method of scoring Oestrogen and Progesterone Receptors expression (ER and PR) from image data obtained from histological slides, the method including using computer apparatus to carry out the steps of:
   a) obtaining the number of pixels in an image having intensities below a predetermined intensity threshold and which are thereby relatively dark compared to other pixels in the image,
   b) obtaining pixel number thresholds to quantify scoring,
   c) comparing the number of relatively dark pixels with the pixel number thresholds and producing an ER or PR score in accordance therewith, and
   d) providing the score for input to a diagnostic report.

2. An automated method of scoring Oestrogen and Progesterone Receptors expression (ER and PR) for image data obtained from histological slides, the method including using computer apparatus to carry out the steps of:
   a) remapping pixel intensities in the image data to increase the contrast of relatively darker image regions and to transform relatively brighter image regions into a contrast-free background,
   b) converting the remapped image data into image data corresponding to thresholded images in which total blob area and brown blob area respectively are distinguished from other image regions,
   c) expressing brown blob area as a proportion of total blob area to provide a first contribution to a score,
   d) providing a second contribution to the score by obtaining the number of relatively dark image pixels compared to relatively bright image pixels and deriving the second contribution in accordance with the magnitude of the number of relatively dark pixels,
   e) deriving the score on the basis of the first and second contributions collectively,
   f) obtaining a hue for the image data and deriving a correction for the score indicated by the first and second contributions if the hue indicates a degree of blueness or brownness which renders such correction appropriate, and
   g) providing the score for input to a diagnostic report.

3. A system for computer-implemented scoring of Oestrogen and Progesterone Receptors expression (ER and PR) from image data obtained from histological slides, the system incorporating a microscope and a camera for photographing a histopathological specimen and arranged to provide digitised colour image data, and computer apparatus for receiving the digitised colour image data, the image data comprising pixels corresponding to blobs and pixels corresponding to background and the computer apparatus incorporating a computer program stored in a memory and being programmed by such computer program to:
   a) obtain the number of pixels in an image having intensities below a predetermined intensity threshold and which are thereby relatively dark compared to other pixels in the image,
   b) obtain pixel number thresholds to quantify scoring, and
   c) compare the number of relatively dark pixels with the pixel number thresholds and score ER or PR in accordance therewith.

4. A system for computer-implemented scoring of Oestrogen and Progesterone Receptors expression (ER and PR) from image data obtained from histological slides, the system incorporating a microscope and a camera for photographing a histopathological specimen and arranged to provide digitised colour image data, and computer apparatus for receiving the digitised colour image data, the computer apparatus incorporating a computer program stored in a memory and being programmed by such computer program to:
   a) remap pixel intensities in the image data to increase the contrast of relatively dark image regions and to transform relatively bright image regions into a contrast-free background,
   b) convert the remapped image data into image data corresponding to thresholded binary images in which total blob area and brown blob area respectively are distinguished from other image regions, c) express brown blob area as a proportion of total blob area to provide a first contribution to a score, d) provide a second contribution to the score by obtaining the number of relatively dark image pixels compared to relatively bright image pixels and deriving the second contribution in accordance with the magnitude of the number of relatively dark pixels, e) derive the score on the basis of the first and second contributions collectively, and f) obtain a hue for the image data and derive a correction for the score indicated by the first and second contributions if the hue indicates a degree of blueness or brownness which renders such correction appropriate.

5. A computer readable hardware medium which embodies computer readable instructions for controlling operation of a computer apparatus to implement scoring of Oestrogen and Progesterone Receptors expression (ER and PR) from image data obtained from histological slides, wherein the instructions provide for control of the computer apparatus to carry out the steps of:

a) obtaining the number of pixels in an image having intensities below a predetermined intensity threshold and which are thereby relatively dark compared to other pixels in the image, b) obtaining pixel number thresholds to quantify scoring, and c) comparing the number of relatively dark pixels with the pixel number thresholds and scoring ER or PR in accordance therewith.

6. A computer readable hardware medium which embodies computer readable instructions for controlling operation of a computer apparatus to score Oestrogen and Progesterone Receptors expression (ER and PR) from image data obtained from histological slides, the instructions providing for control of the computer apparatus to implement the steps of:

a) remapping pixel intensities in the image data to increase the contrast of relatively dark image regions and to transform relatively bright image regions into a contrast-free background, b) converting the remapped image data into image data corresponding to thresholded images in which total blob area and brown blob area respectively are distinguished from other image regions, c) expressing brown blob area as a proportion of total blob area to provide a first contribution to a score, d) providing a second contribution to the score by obtaining the number of relatively dark image pixels compared to relatively bright image pixels and deriving the second contribution in accordance with the magnitude of the number of relatively dark pixels, e) deriving the score on the basis of the first and second contributions collectively, and f) obtaining a hue for the image data and deriving a correction for the score indicated by the first and second contributions if the hue indicates a degree of blueness or brownness which renders such correction appropriate.

* * * * *

UNITED STATES PATENT AND TRADEMARK OFFICE
CERTIFICATE OF CORRECTION

PATENT NO. : 7,646,905 B2 Page 1 of 1
APPLICATION NO. : 10/540444
DATED : January 12, 2010
INVENTOR(S) : Guittet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 930 days.

Signed and Sealed this

Sixteenth Day of November, 2010

David J. Kappos
*Director of the United States Patent and Trademark Office*